United States Patent
Zhang et al.

(10) Patent No.: US 10,051,348 B2
(45) Date of Patent: Aug. 14, 2018

(54) POWER METERING DEVICES, METHODS, AND SYSTEMS

(71) Applicant: Honeywell International Inc., Morris Plains, NJ (US)

(72) Inventors: Eric Zhang, Tianjin (CN); Yi Gu, Tianjin (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/369,196

(22) Filed: Dec. 5, 2016

(65) Prior Publication Data

US 2017/0085968 A1    Mar. 23, 2017

Related U.S. Application Data

(63) Continuation of application No. PCT/CN2014/079249, filed on Jun. 5, 2014.

(51) Int. Cl.
| | |
|---|---|
| *G01R 21/00* | (2006.01) |
| *H04Q 9/00* | (2006.01) |
| *G01D 4/02* | (2006.01) |

(52) U.S. Cl.
CPC ............... *H04Q 9/00* (2013.01); *G01D 4/02* (2013.01); *H04Q 2209/60* (2013.01); *H04Q 2209/86* (2013.01)

(58) Field of Classification Search
CPC ........... G01R 21/00; G01R 21/06; G01D 4/00
USPC ....................................... 340/870.02, 870.04
See application file for complete search history.

(56) References Cited

U.S. PATENT DOCUMENTS

| | | | |
|---|---|---|---|
| 5,822,369 A | 10/1998 | Araki | |
| 6,114,947 A | 9/2000 | Tondorf | |
| 6,957,158 B1* | 10/2005 | Hancock | G01R 19/2513 340/870.2 |
| 8,271,227 B2 | 8/2012 | Matzen | |
| 8,436,745 B2 | 5/2013 | Moulard | |
| 9,035,255 B2 | 5/2015 | Wenger et al. | |
| 2009/0066527 A1* | 3/2009 | Teachman | G01R 22/10 340/657 |

(Continued)

FOREIGN PATENT DOCUMENTS

| | | |
|---|---|---|
| CN | 101454641 A | 6/2009 |
| CN | 101907646 A | 12/2010 |

(Continued)

OTHER PUBLICATIONS

The International Search Report for related PCT application PCT/CN2014/079249, dated Feb. 27, 2015 (4 pages).

*Primary Examiner* — Kevin Kim
(74) *Attorney, Agent, or Firm* — Brooks, Cameron & Huebsch, PLLC

(57) ABSTRACT

Devices, methods, and systems for power metering are described herein. One device includes a first integrated circuit configured to collect metering information, a second integrated circuit configured to communicate the collected metering information to a user interface of the power metering device, and a third integrated circuit configured to configure the first integrated circuit and store parameters for the second integrated circuit, wherein each of the first, second, and third integrated circuits include a single communication port configured to communicate with the other respective communication ports.

19 Claims, 4 Drawing Sheets

(56) References Cited

U.S. PATENT DOCUMENTS

2010/0076616 A1* 3/2010 Kagan ................ G01R 19/2513
700/295
2011/0231027 A1* 9/2011 Lee ........................ G05B 15/02
700/291

FOREIGN PATENT DOCUMENTS

CN 101932911 A 12/2010
CN 202485754 U 10/2012

* cited by examiner

POWER METERING DEVICES, METHODS, AND SYSTEMS

CROSS REFERENCE TO RELATED APPLICATION

This application claims priority to PCT Application No. PCT/CN2014/079249, filed Jun. 5, 2014, which is incorporated herein by reference in its entirety.

TECHNICAL FIELD

The present disclosure relates to methods, devices, and systems for power metering.

BACKGROUND

Power metering systems can be utilized to determine a power consumption of a number of power consuming devices. For example, power metering systems can be utilized to determine power consumption of a building (e.g., office building, house, etc.) and/or power consuming devices of the building.

Power metering systems can utilize transducers to convert a signal that is one form to a signal in a different form. For example, transducers can be used in sensor devices to convert received electrical pulses to a quantity of power utilized and/or consumed.

Power metering can include a multiplex serial data communication system for providing power metering information. However, communications between microcontroller units (MCUs) of a power metering system can be complex, and previous power metering systems may accordingly use multiple terminal pins, receiving pins, and/or communication ports to exchange information for operation. The additional pins and ports may take up a large amount of space, which can create a large printed circuit board assembly (PCBA) and/or an expensive MCU.

DETAILED DESCRIPTION

Figure 1:
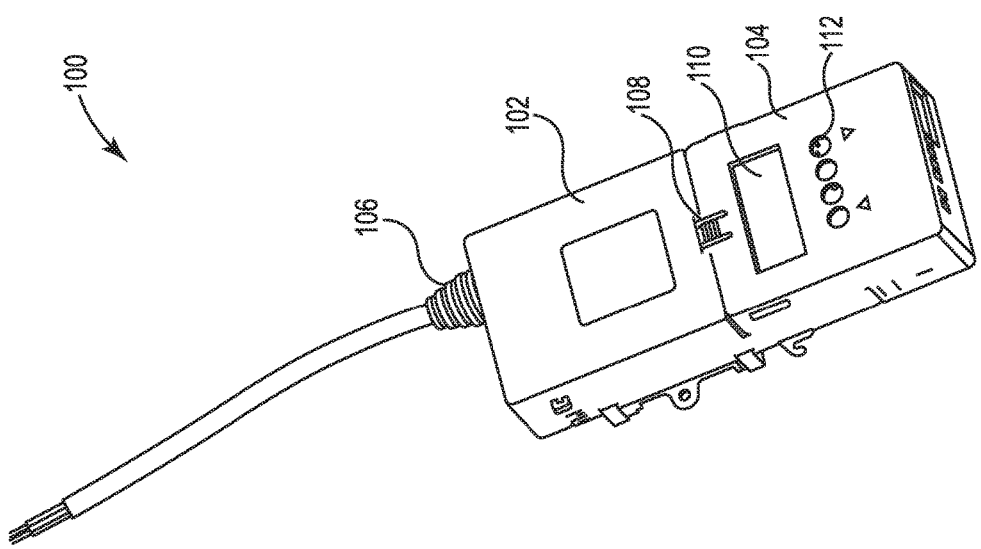
FIG. 1 illustrates an example of a system for power metering according to one or more embodiments of the present disclosure.

Devices, methods, and systems for power metering are described herein. For example, one or more embodiments a power metering device that can have a first integrated circuit (IC) configured to collect metering information, and a second IC configured to communicate the collected metering information to a user interface of the power metering device. In addition, a third IC can be configured to configure the first IC and store parameters for the second IC. Furthermore, the power metering device, each of the first, second, and third integrated circuits (ICs) can include a single communication port configured to communicate with the other respective communication ports.

The power metering systems described herein can include less terminal pins than previous approaches and/or can include a single communication port that can communicate with other communication ports. Accordingly, power metering systems described herein can include smaller and/or cheaper PCBAs and/or MCUs than previous approaches.

A microcontroller unit (MCU) can switch between hardware universal asynchronous receiver/transmitters (UART) and software UART to communicate with a second microcontroller unit (MCU) and an analog to digital converter (ADC) IC. The communication pattern can, in effect, reduce the need for a single UART on each MCU.

The UART, as used herein, is a feature on the MCU that communicates serial data (e.g., text, numbers, etc.) to a computing device. Additionally or alternatively, the UART can change incoming parallel information (e.g., within the MCU, computing device, etc.) to serial data that can be transmitted on a communication line.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. For example, elements 102 and 202 refers to the same physical device herein.

As used herein, "a" or "a number of" something can refer to one or more such things. For example, "a number of sensors" can refer to one or more sensors.

FIG. 1 illustrates an example of a system 100 for power metering according to one or more embodiments of the present disclosure. As shown in FIG. 1, the system 100 can include a power supply 106 coupled to a device 102, and a device 104 coupled to device 102. The device 102 and the device 104 can be individual physical devices that can be coupled together via a latch 108 to connect a number of contacts of the device 102 and the device 104. The number of contacts can enable communication between the device 102 and the device 104. In addition, the number of contacts can enable power from the power supply 106 to be transferred to power the device 104.

In some embodiments, the device 102 can have a relatively limited functionality as compared to device 104. For example, the device 102 can be limited to metering power consumption for a particular area (e.g., building, house, area within a building, etc.). That is, in some embodiments, the device 102 can be a relatively simple meter (e.g., kilowatt meter, etc.) that is not able to perform relatively advanced functions including, but not limited to: display settings, display diagnostics, display information relating to the system 100, receive setting changes, receive setup information, receive protocols, and send protocols, among other functions.

For example, system 100 can utilize device 102 to meter the power consumption, and a user can couple a device 104 to change settings of the system by coupling the device 104 and utilizing the user interface 112 and/or display 110 to change the settings of the system. In addition, there can be cost benefits of installing the device 102 at a plurality of locations and utilizing the device 104 to increase functionality of the devices 102 at each of the plurality of locations.

The device 104 can include and/or add additional functionality to the device 102. The additional functionality can include, but is not limited to: displaying (e.g., to a user) information relating to the system 100, setting up the settings of system 100, debugging, determining, and/or displaying 110 diagnostic information relating to the system 100 (e.g., diagnostic information relating to sensors of system 100), browsing and/or displaying information relating to the system 100 (e.g., information communicated from sensors of system 100), retrieving power consumption data (e.g., from a system coupled to device 104), providing a plurality of communication protocols, and/or utilizing multiple communication protocols simultaneously to meter the power consumption. In some embodiments, the plurality of communication protocols can be utilized by the device 104 simultaneously to meter the power consumption. That is, the device 104 can send and/or receive different communication protocols within the system 100.

The multi-device (e.g., device 102 and device 104, including more than one physical device 102, 104, etc.) system 100 enables a user to provide a first set of functionality when the device 104 is not coupled to device 102 and a second set of functionality when the device 104 is coupled to device 102. The first set of functionality can be more limited than the second set of functionality. In addition, or alternatively, the first set of functionality can be previously installed for a system 100 and the second set of functionality can enable additional functionality in the field by attaching the device 104. That is, additional functionality can be utilized without having to remove device 102 and move the device 102 to a different location in order to browse information and/or change settings for the system 100.

Figure 2:
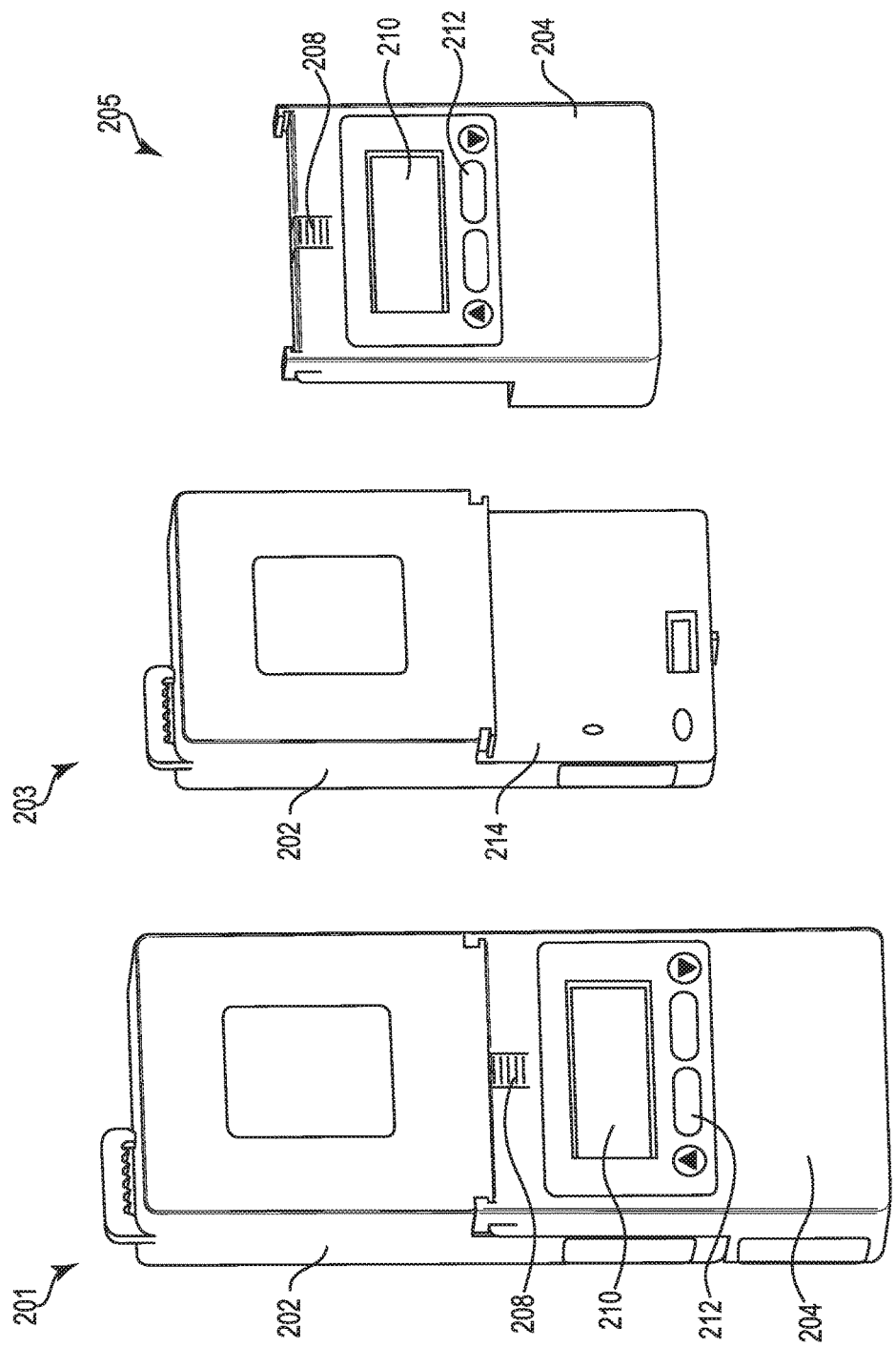
FIG. 2 illustrates an example of a system for power metering according to one or more embodiments of the present disclosure.

FIG. 2 illustrates an example of a system 201 for power metering according to one or more embodiments of the present disclosure. As shown in FIG. 2, system 201 can include systems 203 and 205, which can be coupled together to form system 201. That is, FIG. 2 provides separate illustrations of systems 203 and 205, as well as illustrates of systems 203 and 205 coupled together to form system 201.

As shown in FIG. 2, system 201 can include a device 204 coupled to device 202. Device 202 can be part of system 203, and device 204 can be part of system 205, as illustrated in FIG. 2. Device 204 can be coupled to device 202 at base 214 of system 203 to form system 201.

Devices 202 and 204 can be analogous to devices 102 and 104 previously described herein in connection with FIG. 1. For example, the device 202 and the device 204 can be individual physical devices that can be coupled together via a latch 208 to connect a number of contacts of the device 202 and the device 204. The number of contacts can enable communication between the device 202 and the device 204.

In some embodiments, the device 202 can have a different functionality as compared to device 204. For example, the device 202 can include a simple MCU, which can configure an ADC IC, as will be further described herein, while the device 204 can include a complex MCU, which can control the communication between the two devices, as will be further described herein. Further, in some embodiments, the device 202 can store parameters for the complex MCU of device 204, as will be further described herein, while the complex MCU of device 204 controls the communication between the two devices, as will be further described herein. The communication between devices 202 and 204 can include, for example, serial communication.

In some embodiments, the device 204 can include and/or add additional functionality to the device 202. The additional functionality can include, for example, a user interface 212 and/or display 210 to change the settings of the system. The additional functionality previously described herein in connection with FIG. 1.

Figure 3:
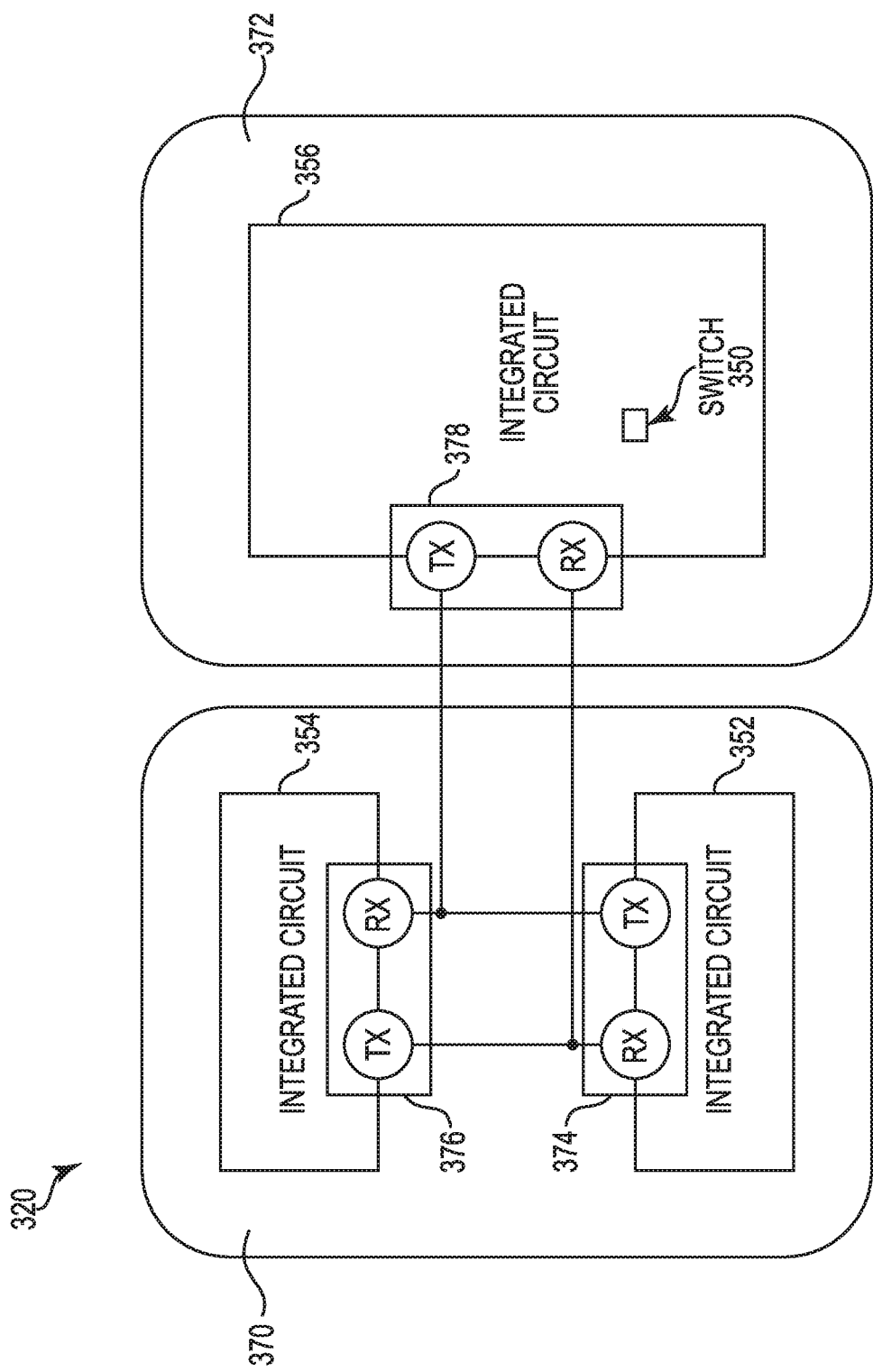
FIG. 3 illustrates an example of a device for power metering according to one or more embodiments of the present disclosure.

FIG. 3 illustrates an example of a device 320 for power metering according to one or more embodiments of the present disclosure. As shown in FIG. 3, power metering device 320 can be comprised of a first printed circuit board assembly (PCBA) 370 and a second PCBA 372. In some embodiments, PCBA 370 can be part of device 202 previously described in connection with FIG. 2, and PCBA 372 can be part of device 204 previously described in connection with FIG. 2. The first and second PCBAs can be separated, as illustrated in FIG. 3. For example, the first PCBA can be independent of the second PCBA.

As shown in FIG. 3, the first PCBA 370 can include a first IC 354 having a single communication port 376 and a second IC 352 having a single communication port 374. That is, each IC 352 and 354 may include a single (e.g., only one) communication port.

In some embodiments, the second IC 352 is configured to configure the first IC 354. For example, the second IC 352 can configure the first IC 354 to perform specified actions based on register values and/or external signals. For instance, the second IC 352 can configure the first IC 354 to record a waveform or level of energy that meets or exceeds a threshold value. Second IC 352 can configure first IC 354 via single communication port 374.

As shown in FIG. 3, the second PCBA 372 can include a third IC 356 having a single (e.g., only one) communication port 378 and a switch 350 configured to couple the single communication port 378 to the single communication ports 376 and 374 of the first and second ICs 354 and 352, respectively. The switch 350 can allow for communication between each of the three ICs 352, 354, and 356 on the two different PCBAs 370 and 372. That is, each respective single communication port 374, 376, and 378 of the ICs can communicate with the other respective communication ports via switch 350.

For example, the switch 350 can be configured to switch between a hardware UART and a software UART. That is, the switch can handle both hardware and software communications.

In some embodiments, the second IC 352 is configured to store parameters for the third IC 356. Further, second IC 352 can transmit, via its single communication port 374, the parameters to third IC 356, and third IC 356 can receive, via its single communication port 378, the parameters from second IC 352. The parameters can include, for example, calibration factors set by the third IC 356. For instance, the parameters may be relevant to load supply, and may designate and/or supply instantaneous or maximum rate of usage demands, voltage, power factors, and reactive powers, among others. For instance, IC 356 can receive via its single communication port 378, the parameters from second IC 354. IC 352 can store the parameters that can support cost/billing cycles, such that the amount of energy used during on-peak and off-peak hours are recorded and/or within a power usage threshold.

As shown in FIG. 3, the single communication ports 374, 376, and 378 of the ICs can each include a transmitter pin and a receiver pin. The transmitter pin of a single communication port (e.g., 374, 376, and 378) can send signals (e.g., digital, etc.) to the receiver pins of the other respective communication ports, and the receiver pin of a single communication port can receive signals from the transmitter pins of the other respective communication ports.

In some embodiments, the first IC 354 is configured to collect metering information. The collected metering information can include, for example, consumption of electricity, natural gas, water, time of use, power outage notifications, voltage, current, and/or power quality, among other information. In some embodiments, the collected metering information includes at least one of power consumption, system diagnostics, voltage, current, and amplitude. The collected metered information can aid in monitoring usage and/or cost. For example, a user may wish to know water consumption levels. Water consumption can be part of the collected metering information. As an additional example, a user may want information regarding an electric power bill. The collected metering information can provide the amount of energy consumed over a period of time, and a cost (e.g., bill) can be calculated based on this information.

In some embodiments, power metering device 320 can include a user interface (not shown in FIG. 3 for simplicity and so as not to obscure the embodiments of the present disclosure). Third IC 356 can communicate the collected metering information to the user interface. For example, third IC 356 can transmit the collected metering information to the user interface via single communication port 378. For instance, third IC 356 can transmit the collected metering information to the user interface via a communication method, such as RS485 and/or Ethernet.

The user interface can display diagnostics of the collected metering information. The diagnostics can include power usage readouts, component locators, failure notifications, histogram reading, update notifications, among other things. For example, a user may views diagnostics related to power usage over a period of time in the form of a graphing display. For instance, the user interface can display whether a power failure, power surge (e.g., spike), or power failure occurred. In some embodiments, the user interface can display information communicated from control signals. For example, the user interface can display a histogram to reflect energy usage for a period of time.

Figure 4:
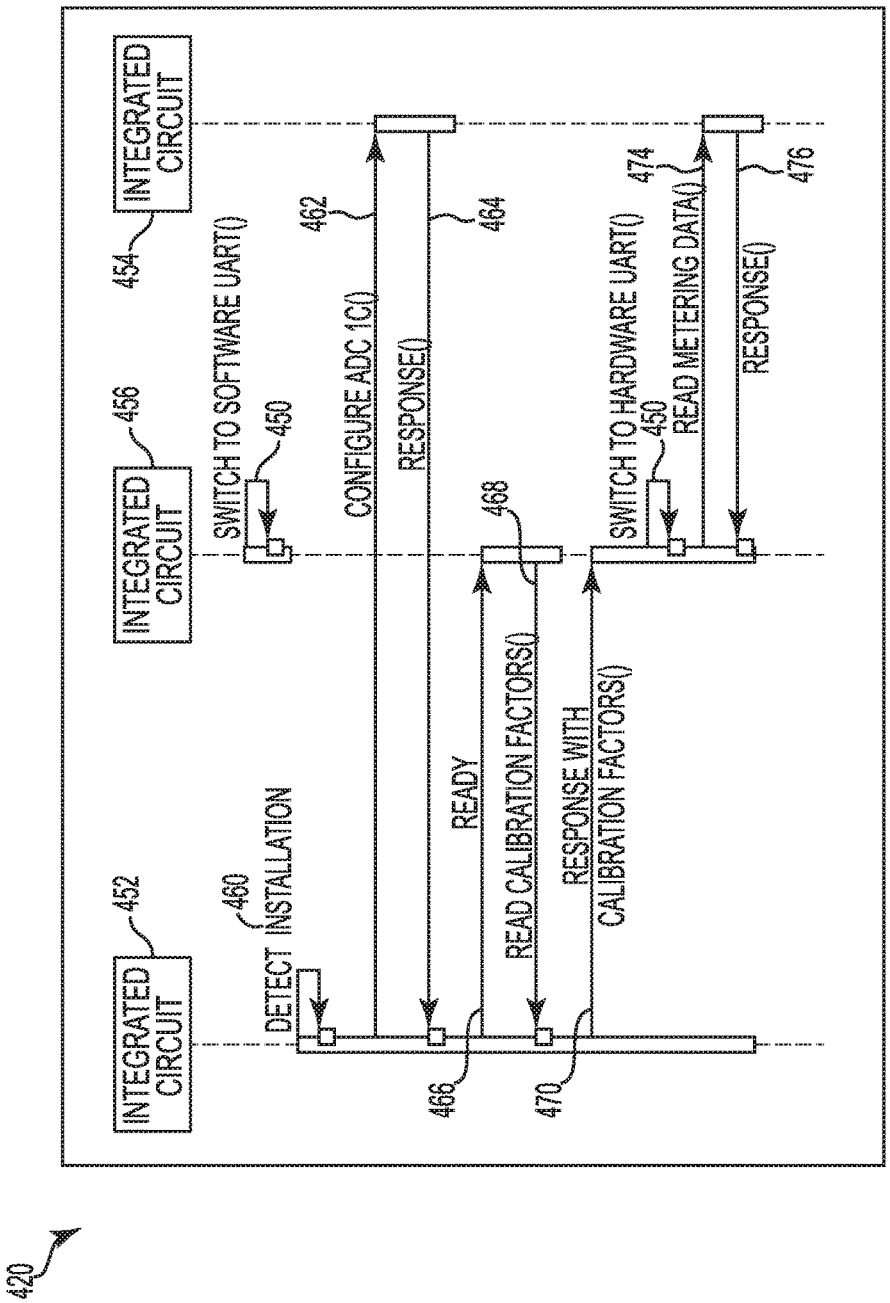
FIG. 4 illustrates an operational example of a power metering device according to one or more embodiments of the present disclosure.

FIG. 4 illustrates an operational example of a power metering device 450 according to one or more embodiments of the present disclosure. Power metering device 420 can be analogous to power metering device 320 previously described in connection with FIG. 3. For example, as shown in FIG. 4, power metering device 450 can include ICs 452, 454, and 456, which can be analogous to ICs 352, 354, and 356, respectively, previously described in connection with FIG. 3. For instance, ICs 452, 454, and 456 can each include a single communication port configured to communicate with the other respective communication ports. The single communication ports can result in fewer terminal pins, which can allow for smaller MCUs to be created.

As shown in FIG. 4, IC 456 can switch 450 its single communication port from a hardware UART to a software UART to communicate between a number of ICs. IC 452 can than detect 460, via its single communication port, installation of IC 456.

IC 452 can configure 462, via its single communication port, IC 454. For example, IC 452 can transmit, via its single communication port, the configuration of IC 454 to IC 454, and IC 454 can receive, via its single communication port, its configuration from IC 452.

Once IC 454 has been configured, IC 454 can respond 464, via its single communication port, to IC 452 that it has been configured. IC 452 can then notify 466 IC 456, via its single communication port, that ICs 452 and 454 (e.g., their terminal pins) are ready to receive information.

As shown in FIG. 4, IC 456 can calibrate IC 454 and can send the calibration factors to IC 452. IC 456 can calibrate, via its single communication port, by reading 468 calibration factors from IC 452 and responding 470 with calibration factors for IC 456. The calibration factors can measure metering information. The calibration factors can be used to make the readings more accurate. For example, the calibration factors can measure frequency, the slope with a network for reference, among other information. Further, calibrating IC 454 can include spatial and temperature resolutions. For example, thermal expansion associated with IC 454 can be calibrated to fall within an acceptable range.

IC 452 can store the calibration of IC 454. Storing can include storing the calibration pattern, rising edge transitions, timing references, falling edge transitions, and sampling, among others. For example, the specific calibration pattern relevant to IC 454 within the power metering device can be stored by IC 452 for a future use.

As shown in FIG. 4, after IC 456 reads the calibration factors, IC 456 can switch 450 its single communication port from the software UART to the hardware UART. IC 456 can then read 474, via its single communication port, metering information (e.g., data) collected by IC 454. For example, IC 454 can transmit (e.g., respond with) 476, via its single communication port, its collected metering information to IC 456. That is, IC 454 can transmit, via its single communication port, the collected metering information to IC 456, and IC 456 can receive, via its single communication port, the collected metering information from IC 454. The transmission of the collected metering information can allow for multiple ICs to communicate, share information, parameters, and/or settings, and can allow for the device 450 to function efficiently and effectively. The transmission can include digital information, load information, measurements, calibrations, efficiency, peaks, and grid reliability, among others. Although not shown in FIG. 4 for clarity and so as not to obscure embodiments of the present disclosure, IC 456 can communicate the collected metering information to a user interface of the power metering device 450, as previously described herein (e.g., in connection with FIG. 3).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A power metering device, comprising:
   a first integrated circuit configured to collect metering information;
   a second integrated circuit configured to communicate the collected metering information to a user interface of the power metering device; and
   a third integrated circuit configured to configure the first integrated circuit and store parameters for the second integrated circuit, wherein the parameters for the second integrated circuit include calibration factors for the second integrated circuit;
   wherein each of the first, second, and third integrated circuits include a single communication port configured to communicate with the other respective communication ports.

2. The device of claim 1, wherein the metering information includes at least one of power consumption, system diagnostics, voltage, current, and amplitude.

3. The device of claim 1, wherein:
   the first integrated circuit is configured to transmit the collected metering information to the second integrated circuit via the single communication port of the first integrated circuit; and
   the second integrated circuit is configured to receive the collected metering information from the first integrated circuit via the single communication port of the second integrated circuit.

4. The device of claim 1, wherein:
   the third integrated circuit is configured to transmit the configuration of the first integrated circuit to the first integrated circuit via the single communication port of the third integrated circuit; and
   the first integrated circuit is configured to receive the configuration of the first integrated circuit from the third integrated circuit via the single communication port of the first integrated circuit.

5. The device of claim 1, wherein:
   the third integrated circuit is configured to transmit the parameters for the second integrated circuit to the second integrated circuit via the single communication port of the third integrated circuit; and
   the second integrated circuit is configured to receive the parameters for the second integrated circuit from the third integrated circuit via the single communication port of the second integrated circuit.

6. The device of claim 1, wherein the user interface of the power metering device is configured to:
   display diagnostics of the collected metering information; and
   display information communicated from control signals.

7. A power metering device, comprising:
   a first printed circuit board assembly, wherein the first printed circuit board assembly includes:
     a first integrated circuit having a single communication port; and
     a second integrated circuit having a single communication port;
   a second printed circuit board assembly, wherein the second printed circuit board assembly includes a third integrated circuit having a single communication port and a switch configured to couple the single communication port of the third integrated circuit to the single communication ports of the first and second integrated circuits.

8. The device of claim 7, wherein the single communication ports of the first, second, and third integrated circuits each include a transmitter pin and a receiver pin.

9. The device of claim 7, wherein the first integrated circuit is configured to collect metering information.

10. The device of claim 7, wherein the second integrated circuit is configured to configure the first integrated circuit.

11. The device of claim 7, wherein the second integrated circuit is configured to store parameters for the third integrated circuit.

12. The device of claim 7, wherein the third integrated circuit is configured to communicate information to a user interface of the device.

13. The device of claim 7, wherein the switch is configured to switch between a hardware universal asynchronous receiver/transmitter and a software universal asynchronous receiver/transmitter.

14. A method for power metering, comprising:
    configuring, by a first integrated circuit via a single communication port of the first integrated circuit, a second integrated circuit;
    calibrating, by the first integrated circuit via the single communication port of the first integrated circuit, a third integrated circuit;
    collecting, by the second integrated circuit, metering information; and
    transmitting, by the second integrated circuit via a single communication port of the second integrated circuit, the collected metering information to the third integrated circuit.

15. The method of claim 14, wherein the method includes detecting, by the first integrated circuit via the single communication port of the first integrated circuit, installation of the third integrated circuit.

16. The method of claim 14, wherein the method includes storing, by the first integrated circuit, the calibration of the third integrated circuit.

17. The method of claim 14, wherein the method includes switching, by a single communication port of the third integrated circuit, from a software universal asynchronous receiver/transmitter to a hardware universal asynchronous receiver/transmitter after the third integrated circuit is calibrated and before the metering information is collected.

18. The method of claim 14, wherein the method includes switching, by a single communication port of the third integrated circuit, from a hardware universal asynchronous receiver/transmitter to a software universal asynchronous receiver/transmitter before the second integrated circuit is configured.

19. The method of claim 14, further comprising displaying diagnostics of the metering information via a user interface.

* * * * *